(12) United States Patent
Gibson et al.

(10) Patent No.: US 7,785,230 B2
(45) Date of Patent: Aug. 31, 2010

(54) VARIABLE DISPLACEMENT ENGINE POWERTRAIN FUEL ECONOMY MODE

(75) Inventors: Alex O'Connor Gibson, Ann Arbor, MI (US); Ilya V. Kolmanovsky, Novi, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 509 days.

(21) Appl. No.: 11/750,574

(22) Filed: May 18, 2007

(65) Prior Publication Data

US 2008/0287253 A1    Nov. 20, 2008

(51) Int. Cl.
    *F16H 61/58* (2006.01)
(52) U.S. Cl. ............... 477/62; 477/83; 477/101; 477/176
(58) Field of Classification Search .......... 477/83, 477/62, 54, 101, 107, 115, 176; 74/335; 701/54, 56
See application file for complete search history.

(56) References Cited

U.S. PATENT DOCUMENTS

| | | | |
|---|---|---|---|
| 5,086,889 A | 2/1992 | Nobumoto et al. | |
| 5,527,238 A * | 6/1996 | Hrovat et al. | 477/166 |
| 5,588,937 A | 12/1996 | Kono et al. | |
| 6,405,844 B1 * | 6/2002 | Takamatsu | 192/3.26 |
| 6,565,483 B2 | 5/2003 | Segawa et al. | |
| 7,288,046 B2 * | 10/2007 | Boone et al. | 477/54 |
| 7,509,201 B2 * | 3/2009 | Bolander et al. | 701/53 |
| 2005/0130797 A1 | 6/2005 | Kushiyama et al. | |
| 2008/0269981 A1* | 10/2008 | Pagnotta et al. | 701/35 |
| 2008/0288146 A1* | 11/2008 | Beechie et al. | 701/58 |

FOREIGN PATENT DOCUMENTS

JP    60001334    1/1985

OTHER PUBLICATIONS

Nester, Tyler M., "Vibration Reduction in a Variable Displacement Engine Using Pendulum Absorbers", SAE Technical Paper No. 2003-01-1484.

* cited by examiner

*Primary Examiner*—David D Le
(74) *Attorney, Agent, or Firm*—Allan J. Lippa; Alleman Hall McCoy Russell & Tuttle LLP

(57) ABSTRACT

A vehicle drive system for adjusting vehicle fuel economy is described. In one example, the vehicle drive system includes an operator interface for adjusting vehicle operation so as to increase or decrease fuel consumption according to a driver preference.

16 Claims, 9 Drawing Sheets

VARIABLE DISPLACEMENT ENGINE POWERTRAIN FUEL ECONOMY MODE

BACKGROUND AND SUMMARY

Variable displacement engines (VDE) can operate in a partial-cylinder operation mode to reduce fuel usage. However, such a partial-cylinder operation may increase noise, vibration and harshness (NVH) compared to an all-cylinder operation, and the increased NVH may degrade drive feel and/or driver comfort.

Torque converters which can provide a fluid coupling between the engine and the transmission may be operated in an unlocked or partially unlocked state to absorb torque fluctuation and improve NVH. However fuel efficiency may be compromised as a result, since a portion of engine torque energy (in general up to 10%) may be lost as a result of the torque converter fluid coupling. To control the amount of torque converter fluid coupling and therefore the torque energy loss, slip control clutches may be added to a torque converter, and the amount of fluid coupling is controlled by controlling the slip rotation rate or slip of the torque converter. The more slip is allowed by the slip control clutch, the more fluid the coupling between the engine and the transmission, the more torque fluctuation is absorbed, which translates to better NVH, but in the mean time more engine torque energy will also be lost; and vice versa. A trade-off therefore exists between fuel economy and NVH in adjusting the torque converter slip rotation rate. Similarly, trade-offs between fuel economy and NVH may also exist for adjusting other vehicular parameters.

The inventors herein have recognized that various drivers under different drive conditions may wish to make different tradeoffs between fuel economy and NVH. For example, one driver may prefer improved fuel economy while another may prefer an improved NVH, or the same driver may prefer improved fuel economy in one instance but may prefer an improved NVH in another.

The inventors recognize that the above issues may be addressed by providing a driver interface that allows a driver to select a drive mode or preference setting that reflects the driver's preference over fuel economy and NVH trade-off. Vehicle operating parameters may then be adjusted according to the driver selected drive mode. For example, the slip rotation rate or slip profile of a slip control clutch may be adjusted to reflect the driver selected preference setting or tradeoff between fuel economy and NVH in a variable displacement engine, as well as the cylinder deactivation state.

DETAILED DESCRIPTIONS

Figure 1:
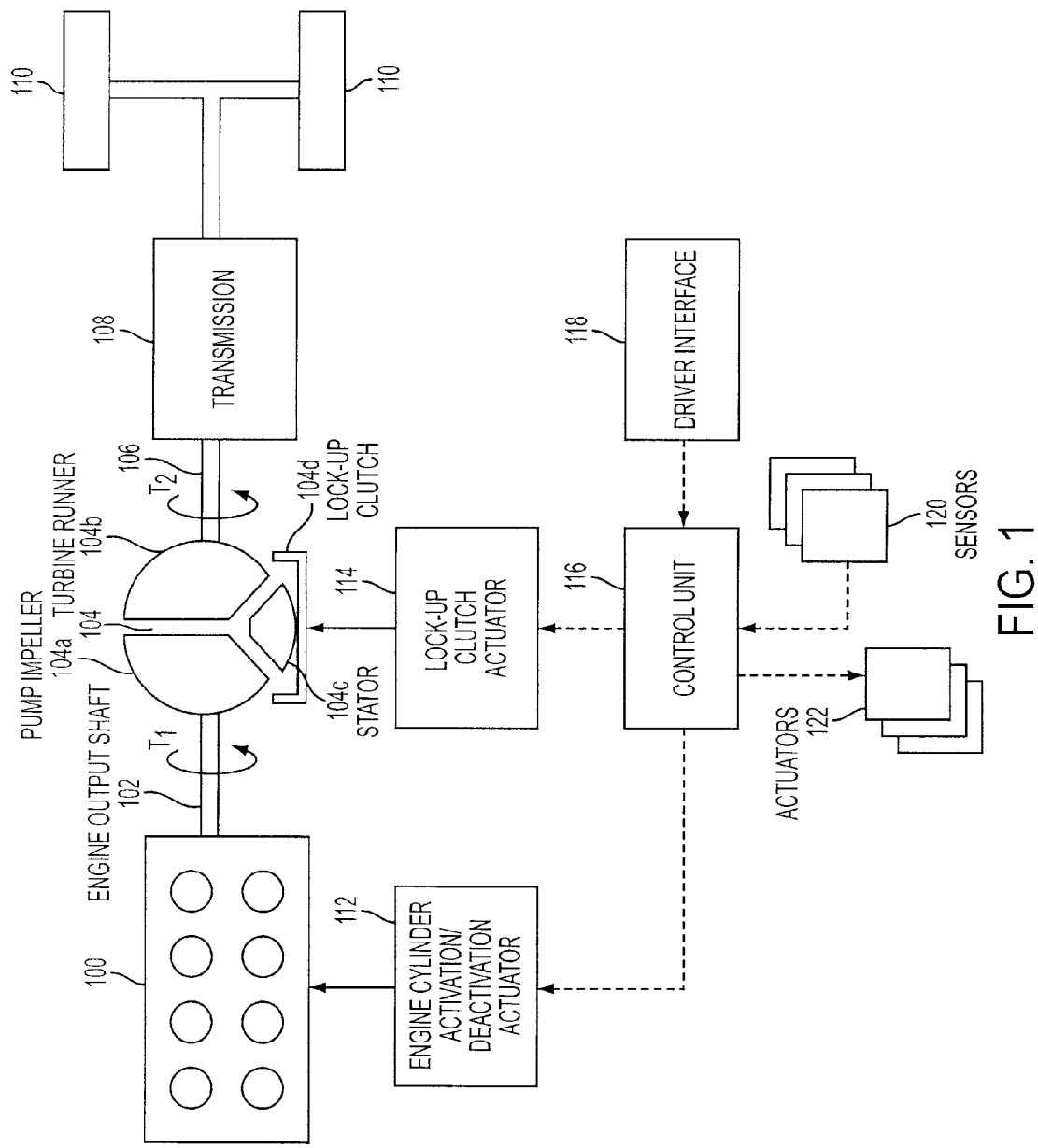
FIG. 1 illustrates an example drive system.

FIG. 1 illustrates an example drive system of a motor vehicle. The drive system may include an engine 100 coupled to an engine output shaft 102, a torque converter 104 coupled to a transmission input shaft 106, a transmission 108, wheels 110. The torque converter 104 includes a pump impeller 104a, a turbine runner 104b, a stator 104c, and a lock-up clutch 104d. The torque converter 104 also contains a torque converter fluid (not shown).

The system may further include an engine cylinder activation/deactivation actuator 112, a lock-up clutch actuator 114, a control unit 116, a driver interface 118, various sensors 120 and actuators 122. The drive system may also include other components, such as a final drive unit, a transfer case (e.g. 4×4 transfer case, not shown), etc. The engine 100 outputs a torque T1 and the torque converter outputs a torque T2.

Referring to the details of torque converter 104, the engine output shaft 102 is coupled to the torque converter 104 through the pump impeller 104a, and the transmission input shaft 106 is coupled to torque converter 104 through the turbine runner 104b. The stator 104c is situated in between the pump impeller 104a and the turbine runner 104b. The lock-up clutch 104c is coupled to both the pump impeller 104a and the turbine runner 104b and is capable of producing an engaging pressure that engages the pump impeller 104a and the turbine runner 104b.

Engine torque is transferred from the engine to the torque converter through the engine output shaft, and then from the torque convert to the transmission through the transmission input shaft, and then from the transmission to the wheels through the transfer case.

Inside the torque converter, the engine output torque T1 is transferred from the pump impeller 104a through a fluid coupling provided by the torque converter fluid. To be more specific, the engine output shaft rotates and causes the pump impeller to rotate. The pump impeller causes the fluid inside the torque converter to spiral, and the spiraling torque converter fluid causes the turbine runner to rotate, which then causes the transmission input shaft to rotate.

The engine 100 may operate in various modes. For example, engine 100 may deactivate various numbers of cylinders, such as one cylinder or a plurality of cylinders, and operate with the rest of cylinders that remain active. In one example, the cylinders may be mechanically deactivated by holding both intake and exhaust valves closed for a full cycle of the cylinder e.g., via a cam profile switching mechanism, valve lifter deactivators, etc. In this example, engine 100 may be referred to as a variable displacement engine (VDE).

The engine 100 may be of one of various types of engines. For example, it may be a rotary-piston engine or a reciprocating piston engine. The engine may burn various types of fuels, for example it may be a gasoline burning or a diesel fuel burning engine. Additionally, the engine may use different stroke cycles, for example it may use a two-stroke or a four-stroke cycle. Furthermore, the cylinders of the engine may be laid out in various configurations with at least two groups. For example, the cylinders may be arranged in a line as in in-line engines, arranged in a v configuration as in v engines, arranged in w configuration as in w engines, arranged into two opposing banks of cylinders as in flat engines, or a combination of different engine configurations.

Although one lock-up clutch 104d is provided, the torque converter 104 may also contain more than one lock-up clutches. The lock-up clutch may be of various types that can allow various states of engagements between the pump impeller 104a and the turbine runner 104b, such as a wet-type friction clutch, by for example providing various degrees of slip between the pump impeller 104a and the turbine runner 104b. The lock-up clutch may be electronically control via an electromechanical actuator, electro-hydraulic actuator, etc.

The transmission 108 may be one or more of various type of transmission, such as manual transmission, automatic transmission which, semi-automatic transmission, continuous variable transmission (CVT), or a combination above.

The driver interface 118 may be one or more various types of suitable interfaces that allow a driver to select a preference setting specifying a balance between fuel economy and noise, vibration and harshness (NVH). For example, it may be a dial, a key pad, a touch screen, a voice interface, a digital interface that enables a PDA or other consumer electronic device to interface to the vehicle, etc.

The control unit 116 may be an engine control unit, power train control unit, control system, or combinations of various control units, may be further coupled to various other sensors 120 and various actuators 122 (e.g., fuel injection actuator, spark ignition actuator, throttle valve actuator, etc) for sensing and controlling the vehicle operating conditions.

The control unit 116 may activate or deactivate one or more engine cylinders through the engine cylinder activation/deactivation actuator 112. For example, when the control unit 116 senses a low engine load operating condition, the control unit 116 may send signals to the engine cylinder activation/deactivation actuator 112 to selectively deactivate one or more cylinders. On the other hand, when the control unit 116 senses a high speed and/or high load operating condition, the control unit 116 may send signal to the engine cylinder activation/deactivation device 112 to activate all cylinders to increase engine output.

The control unit 116 may also control the operation of the lock-up clutch 104d through the lock-up clutch actuator 114. For example, the control unit 116 may sense a vehicle operating condition (e.g., through the various sensors 120 and actuators 122, calculates a target lock-up clutch engagement pressure, which corresponds to a target engagement state for the pump impeller 104a and the turbine runner 104, and then sends signals to the lock-up clutch actuator 114 to cause the lock-up clutch 104d to apply the target engagement pressure to the pump impeller 104a and turbine runner 104b.

The engagement state between the pump impeller 104a and the turbine runner 104b depends on the lock-up clutch engagement pressure applied. For example, if the engagement pressure ($P_{EN}$) is at or above a threshold value ($P_A$), or $P_{EN} \geq P_A$, the pump impeller 104a and turbine runner 104b become fully engaged, that is they move as an integral part; if the engagement pressure is at or below a threshold value $P_B$, the pump impeller 104a and the turbine runner 104b become completely disengaged, leaving only a fluid coupling between the pump impeller 104a and the turbine runner 104b; and if the engagement pressure is between threshold values $P_A$ and $P_B$ the pump impeller 104a and the turbine runner 104b become partially engaged, allowing some slip between the pump impeller 104a and the turbine runner 104b and the slip decreases with a increase in the engagement pressure.

The driver selected preference setting may affect the lock-up clutch operation. For example, the control unit 116 may further modify the lock-up clutch control based on the driver preference setting received from the driver interface 118. For example, when a driver selects a preference setting that favors an improved fuel economy, the control unit 116 may decrease the target slip of the lock-up clutch 104d according to the driver specified preference setting, or use a slip control map corresponding to the driver preference setting to determine a target slip. On the other hand, when a driver selects a preference setting that favors an improved NVH or a decreased NVH, the control unit 116 may increase the target slip of the lock-up clutch 104d according to the driver specified preference setting. A more detailed description is provided in reference to FIG. 5.

The driver selected preference setting may also affect operation of other vehicle components, such as the VDE operation. For example, the control unit 116 may modify the VDE operation control based on the driver preference setting received from the driver interface 118. In a more specific example, if a driver selects a preference setting that favors better fuel economy, the control unit 116 may expand the partial cylinder operation, that is partial cylinder operation will be used under more vehicle drive conditions. On the other hand, if a driver selects a preference setting that favors less NVH, the control unit 116 may shrink the partial cylinder operation, that is partial cylinder operation will be used under less vehicle drive conditions. A more detailed description is provided in reference to FIG. 7.

In one example, the control system may adjust both VDE operation and torque converter operation in a coordinated way to accommodate a driver selected preference setting during vehicle operation. For example, if a driver selects a preference setting that favors an improved NVH, the control unit 116 may contract the partial cylinder operation and/or shift to a map for controlling the torque converter control that corresponds to the selected driver preference setting. Further, the control unit 116 may allow more torque converter slip when the engine is in a partial engine operation mode to reduce the effect of partial engine operation on NVH. In this way, it may be possible to achieve a better balance between fuel economy and NVH, and it may also be possible to achieve significant fuel economy without sacrificing too much NVH.

It is also possible that other aspects of vehicle operation, such as acceleration rate and transmission gear ratio, may also be affected by the driver selected preference setting.

By providing such a driver interface and by providing mechanisms to modify various aspects of a vehicle operation, a driver may customize the balance or trade-off between fuel economy and NVH based on his/her need, preference setting, and/or drive condition.

Figure 2:
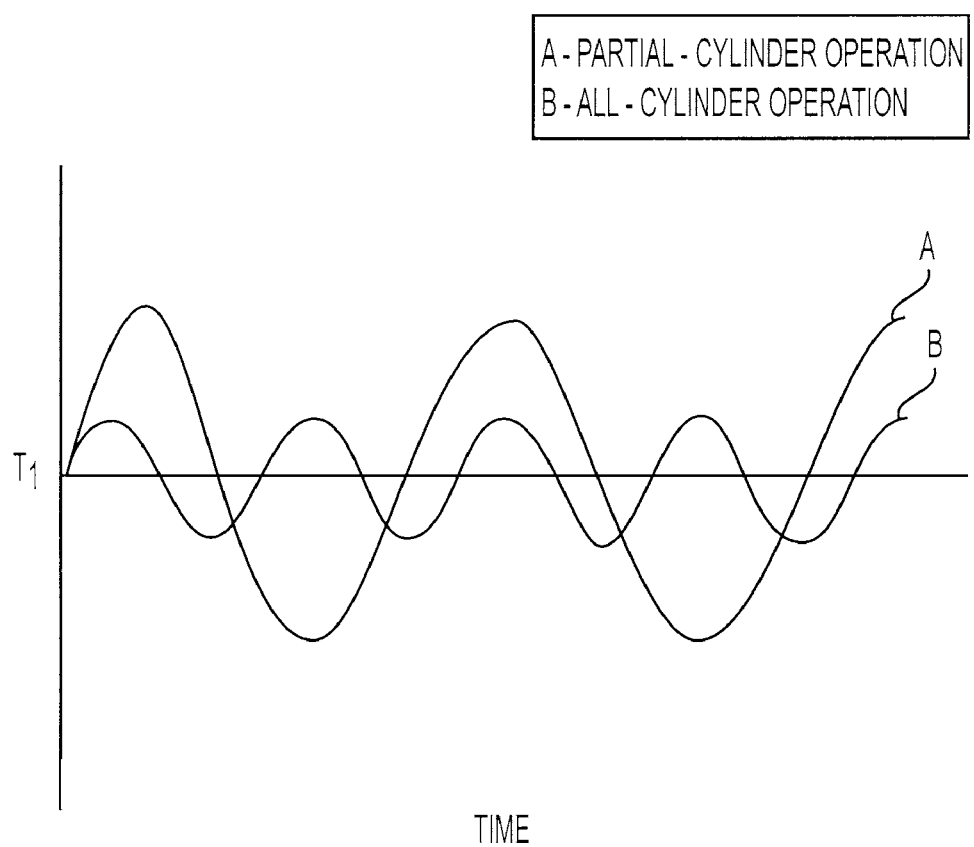
FIG. 2 compares engine torque fluctuation in a partial-cylinder operation and an all-cylinder operation.

FIG. 2 compares the engine torque T1 (see FIG. 1) fluctuation in a partial-engine operation with that of an all-cylinder operation. The engine torque T1 fluctuation is more intense in a partial-cylinder operation (as represented by line A) than in an all-cylinder operation (as represented by line B). Since fewer cylinders are in operation in a partial cylinder operation, to provide the same engine torque/power output, individual cylinder in a partial-cylinder operation must work harder compared to in a full-cylinder operation. Consequently, there may be more intense torque fluctuation and more noise, vibration and harshness (NVH) in a partial-cylinder operation.

Figure 3A:
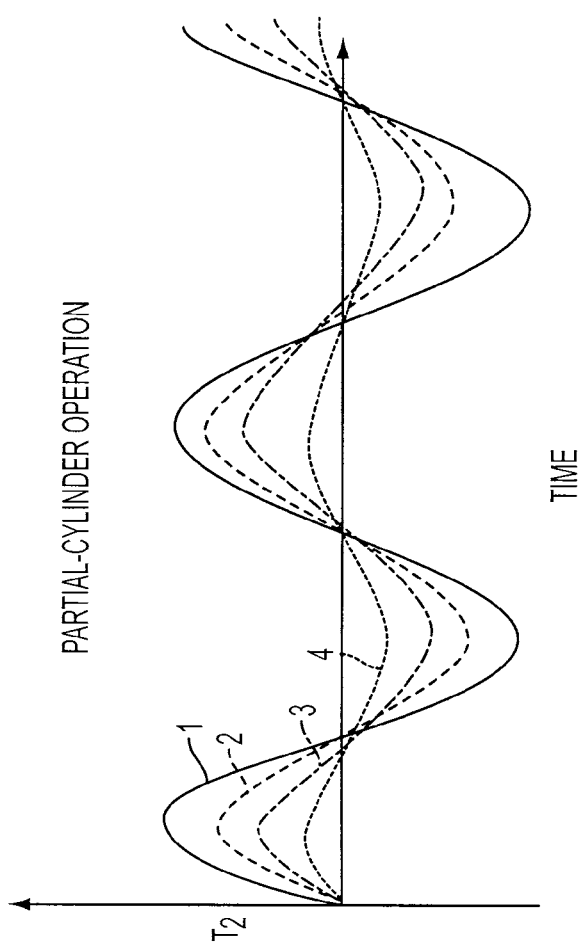
FIG. 3 compares the torque converter output torque under different engine operating conditions (partial-cylinder or all-cylinder operation) and different lock-up clutch states (locked or unlocked state).

FIG. 3A illustrates a dampening effect of the torque converter on torque fluctuation in a partial-cylinder operation. Lines 1, 2, 3 and 4 represent torque output of the torque converter (T2 of FIG. 1) when the torque converter has 0%, 30%, 70% and 100% slip, respectively.

Figure 3B:
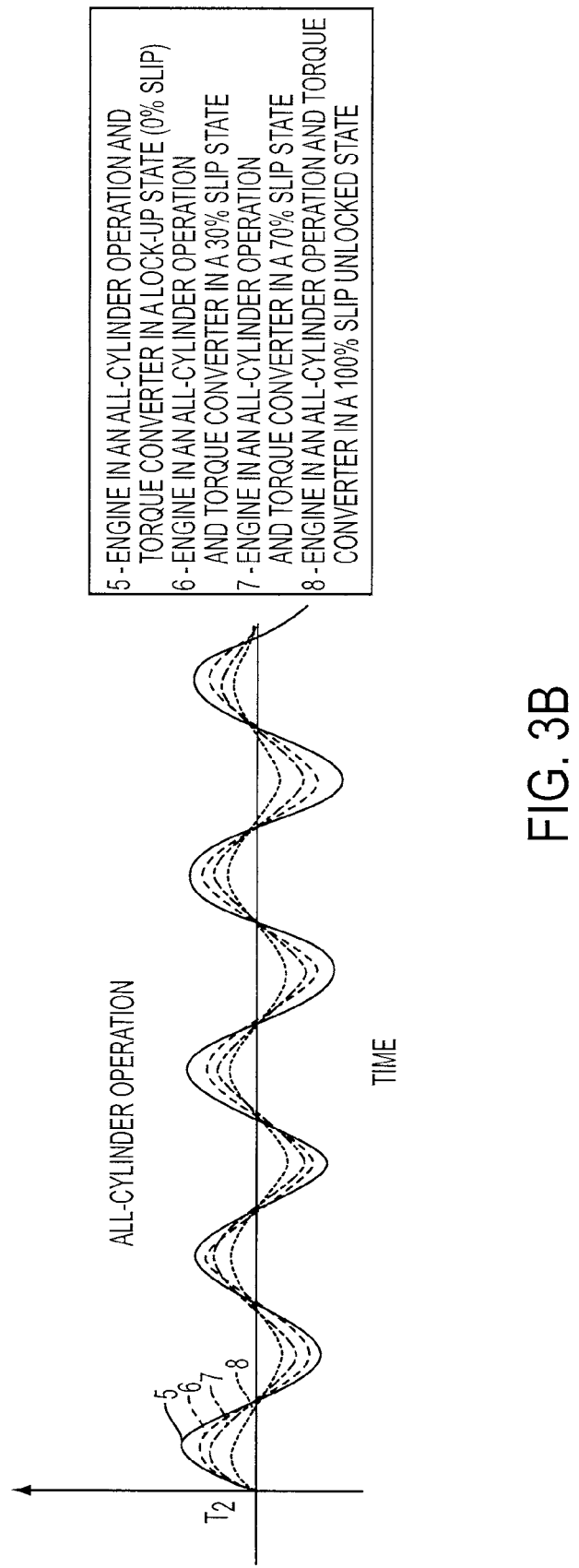

FIG. 3B illustrates a dampening effect of a torque converter on torque fluctuation in an all-cylinder operation. Lines 5, 6, 7 and 8 represent torque output of a torque converter (T2) when the torque converter has 0%, 30%, 70% and 100% slip, respectively.

A slip of 0% occurs when the pump impeller and the turbine runner are fully engaged and moves as an integral part. A slip of 100% indicates that there is a complete fluid coupling and no mechanical engagement between the pump impeller and the turbine runner. A slip between 0 to 100% indicates that the pump impeller and the turbine runner are partially mechanically engaged and there is some slip between them. As the slip decreases, the engagement between the pump impeller (104a) and the turbine runner (104b) increases.

Figure 4:
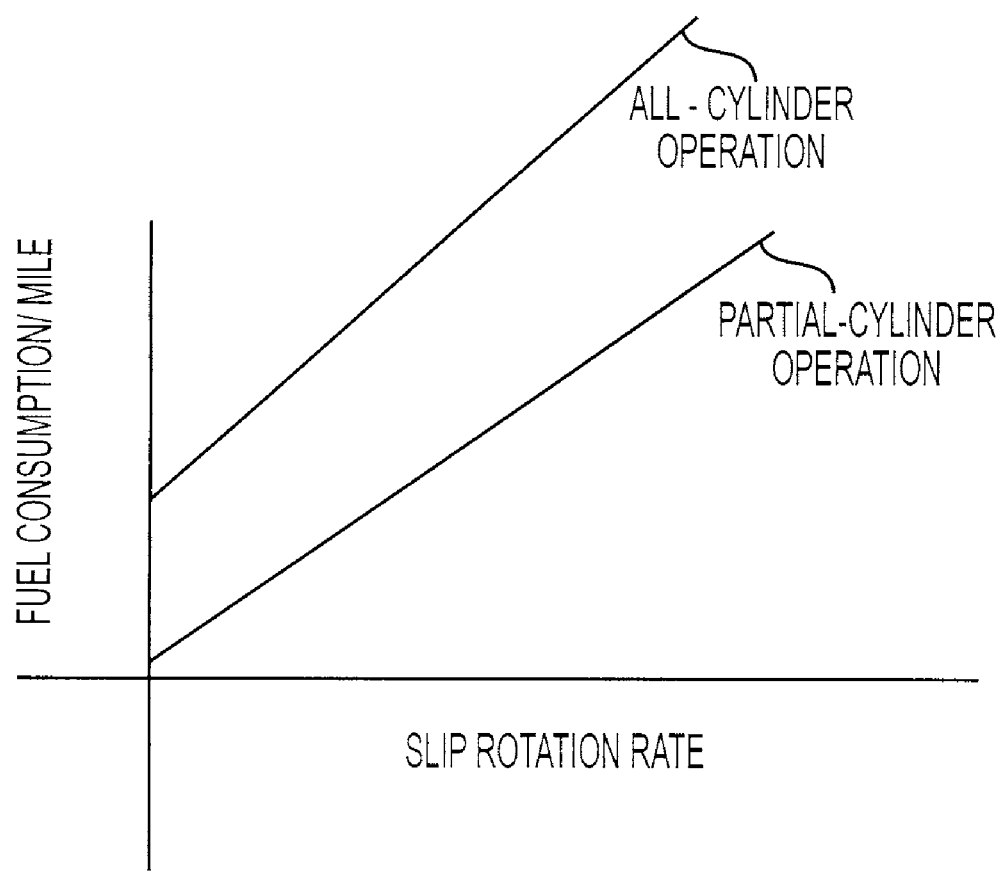
FIG. 4 illustrates a relationship between fuel economy and the lock-up clutch slip or slip rotation rate.

FIG. 4 illustrates a relationship between the fuel consumption for each mile traveled and the torque converter slip or slip rotation rate. As torque converter slip increases, fuel consumption for each mile traveled increases or fuel economy for both partial-cylinder operation and all-cylinder operation.

The specific routines described below in the flowchart may represent one or more of any number of processing strategies such as event-driven, interrupt-driven, multi-tasking, multi-threading, and the like. As such, various acts or functions illustrated may be performed in the sequence illustrated, in parallel, or in some cases omitted. Likewise, the order of processing is not necessarily required to achieve the features and advantages of the examples described herein, but is provided for ease of illustration and description. Although not explicitly illustrated, the illustrated acts or functions may be repeatedly performed depending on the particular strategy being used, during engine operation. Further, these figures may graphically represent code to be programmed into the computer readable storage medium in a controller or control system.

Figure 5:
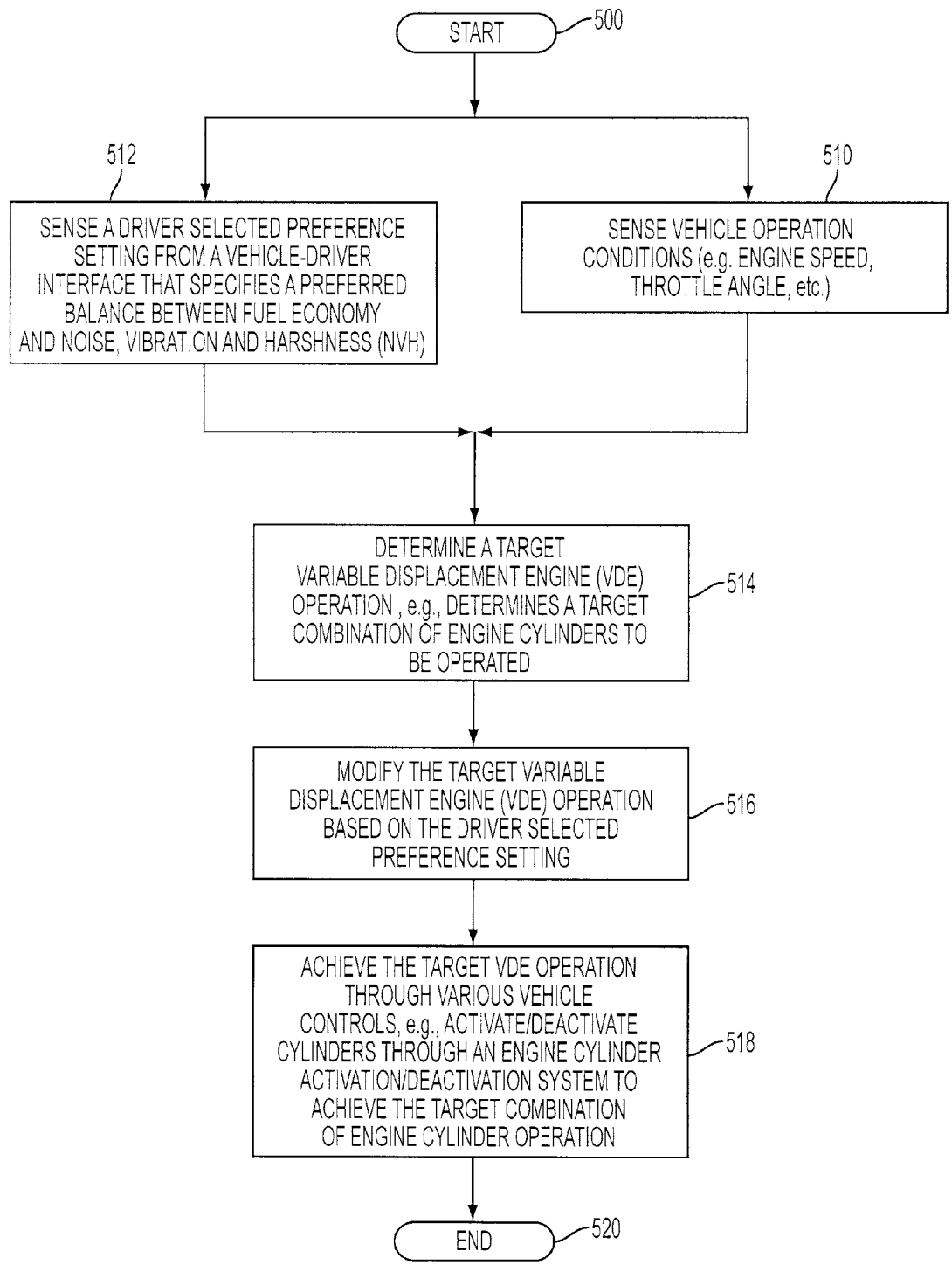
FIG. 5 illustrates a routine for adjusting variable displacement engine (VDE) operation.

FIG. 5 exemplifies a routine for adjusting VDE operation.

At 510, a control unit senses vehicle operating condition, for example engine speed, throttle angle, etc., via various sensors (e.g., 120).

At 512, the control unit senses a driver selected preference setting from a driver interface (e.g., 118) that specifies a driver's preferred balance between fuel economy and noise, vibration and harshness (NVH).

At 514, the control unit then determines a target variable displacement engine (VDE) operation based on the vehicle operating condition, e.g., determines a target combination of engine cylinders to be operated.

At 516, the control unit modifies the target VDE operation based on the driver selected preference setting from 512.

At 518, the control unit achieves the target VDE operation through various vehicle controls, e.g. activates/deactivates cylinders through an engine cylinder activation/deactivation device to achieve the target combination of engine cylinder operation.

When a driver selects an improved fuel economy and an increased NVH preference setting through a driver interface, the target VDE operation may be such that it favors fuel economy while compromising NVH. For example, a smaller number of engine cylinders would be put into operation compared to when a driver selects a preference setting that favors an improved NVH. On the other hand, when a driver selects a preference setting that favors an improved NVH, the target VDE operation may be such that it improves NVH while compromising fuel economy. For example, a larger number of engine cylinders would be put into operation compared to when a driver selects a preference setting that favors an improved fuel economy.

Although in this example, VDE operation is controlled independent of other vehicle operations. It is possible in other examples, VDE operation may be coordinated with other vehicle operations, such as torque converter operation.

Figure 6:
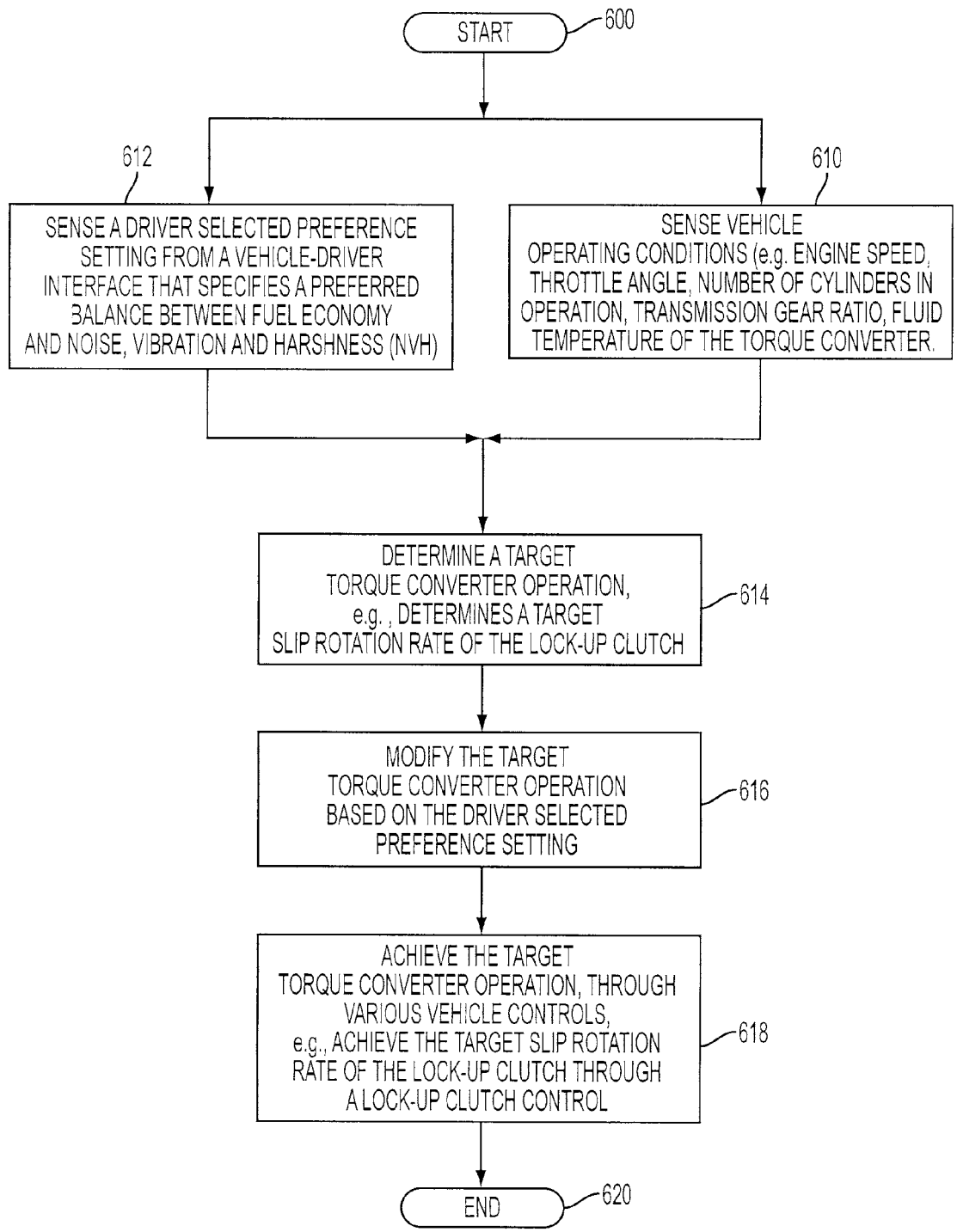
FIG. 6 illustrates a routine for adjusting torque converter operation.

FIG. 6 exemplifies a routine for adjusting torque converter operation.

At 610, a control unit senses vehicle operating conditions, e.g., engine speed, throttle angle, number of engine cylinders in operation, transmission gear ratio, fluid temperature of the torque converter.

At 612, the control unit senses a driver selected preference setting from a driver interface that specifies a preferred balance between fuel economy and NVH.

At 614, the control unit determines a target torque converter operation based on vehicle operating conditions, e.g., determines a target slip or slip rotation rate of the lock-up clutch.

At 616, the control unit modifies the target torque converter operation based on the driver selected preference setting.

At 618, the control unit achieves the target torque converter operation through various vehicle controls or actuators, e.g., through a lock-up clutch actuator (e.g., 114). When a driver selects a preference setting that favors an improved fuel economy through a driver interface, the target torque converter operation is adjusted so that the engine achieves an improved fuel economy while compromising NVH. On the other hand, when a driver selects a preference setting that favors an improved NVH, the target torque converter operation may be adjusted so that an improved NVH (translates to a smoother drive and a better drive feel) will be achieved while compromising fuel economy.

Although in this example the torque converter operation control is only based on the driver selected preference setting and is independent of other vehicle operations, such as the VDE operation, in other examples, the torque converter operation control may be based on both the driver selected preference setting and other vehicle operations, such as the VDE operation. In other words, the torque converter slip rotation rate may be based on both the driver selected preference setting and the VDE operation, in some instances in a coordinated way.

Figure 7:
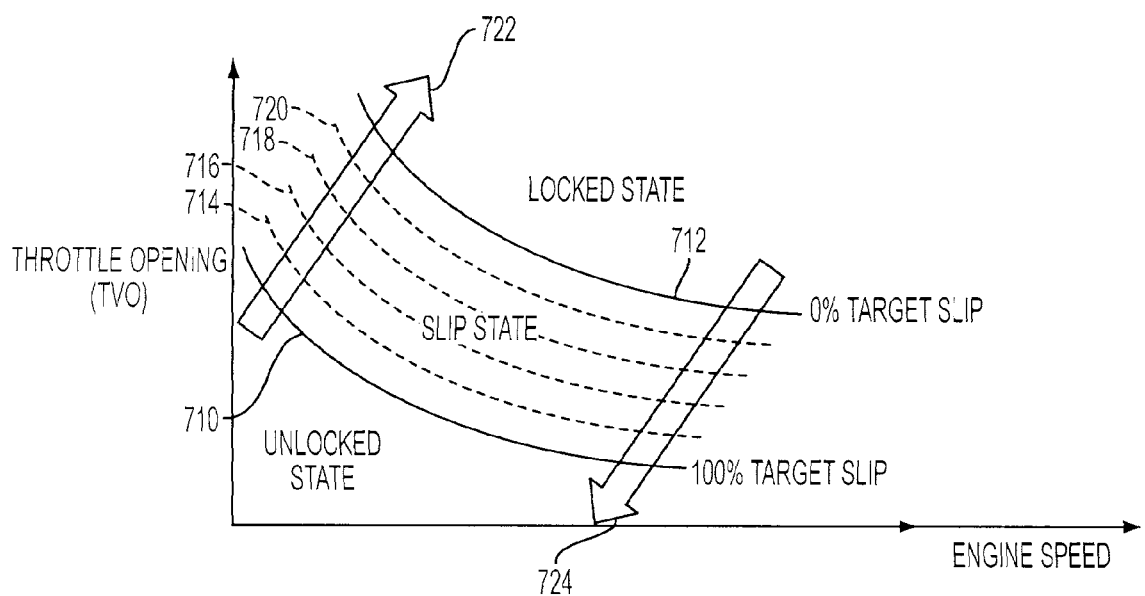
FIG. 7 illustrates an effect of driver selected drive mode on the lockup clutch slip control map.

FIG. 7 illustrates an effect of driver selected drive mode or preference setting on torque converter slip schedule or map. In this example, torque converter slip is mapped against throttle opening and engine speed.

Line 710 represents 100% target slip for the torque converter while line 712 represents 0% target slip for the torque converter. The target slip is 0% for the torque converter when the engine operating condition falls on line 720 and the torque converter is in a locked state. The target slip is 100% and the torque converter is in an unlocked state when the engine operating condition falls on or below line 710. The target slip is 0% and the torque converter is in a locked state when the engine operating condition falls on or above line 712.

The torque converter is in a partially locked state in the region between lines 710 and 712. Lines 714, 716, 718, and 720 represent 80%, 60%, 40%, and 20% slip, respectively. In the partially locked stated, the torque converter may be commanded to achieve a target or desired slip or slip (e.g., speed differential, or percentage of speed differential) based on the engine speed and load.

The torque converter schedule may be adjusted based on a driver selected preference setting that may adjust fuel economy and NVH. In the example shown in FIG. 7, arrows 730 and 732 illustrate how the lines (e.g., 710, 714, 716, 718, 720, and 712) may be shifted as the driver selected setting varies. Specifically, as the driver requests an improved fuel economy, the schedule may shift in the direction indicated by arrow 722, and as the driver requests an improved NVH performance, the schedule may shift in the direction indicated by arrow 724. Thus, in one example, as the driver selected preference setting favors an improved fuel economy, the torque converter may be adjusted towards less slip. That is, the target slip may decrease for a given throttle opening and engine speed. The decrease in slip may increase fuel economy by decreasing torque loss during torque conversion, while possibly increasing NVH by providing less torque fluctuation dampening effect. On the other hand, as the driver selected preference setting favors an improved NVH (e.g. smoother drive), the torque converter may increase slip. That is, the target slip may increase for a given throttle opening and engine speed. The increase in slip may decrease fuel economy by increasing torque loss during torque conversion while improving NVH by providing more torque fluctuation dampening effect.

Figure 8:
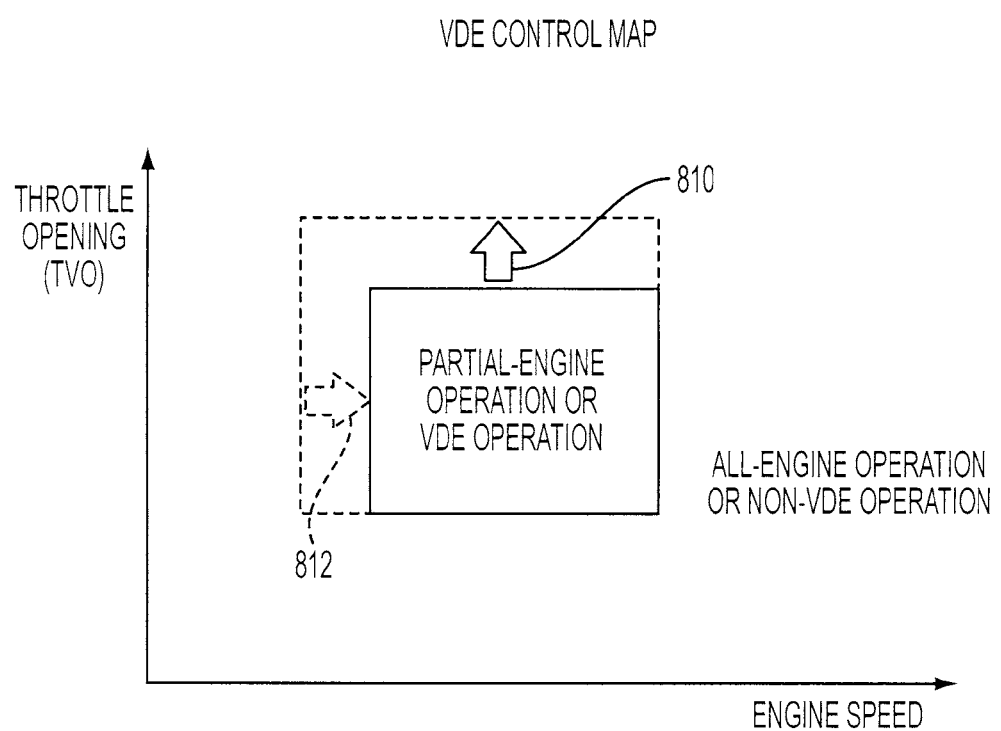
FIG. 8 illustrates an effect of driver selected drive mode on the operation of a variable displacement engine (VDE).

FIG. 8 illustrates an effect of a driver selected preference setting on the variable displacement engine (VDE) operation. The VDE operation is plotted against throttle opening and engine speed.

Arrow 810 illustrates how the VDE operation boundary may expand when a driver selects a preference setting that favors an improved fuel economy. That is, VDE operation would be used for more engine operating conditions, for example, VDE operation may be used at a higher load (e.g. indicated by larger throttle opening). VDE operation decreases fuel consumption and therefore improves fuel economy by decreasing the number of cylinders in operation, but it also may degrade NVH, which translates to a rougher drive, since the smaller number of engines in operation increases engine torque fluctuation.

Arrow 812 illustrates how the VDE operation boundary may contract when a driver selects a preference setting that favors an improved NVH, that is the VDE operation would be used for less engine operating conditions.

The following claims particularly point out certain combinations and subcombinations regarded as novel and nonobvious. These claims may refer to "an" element or "a first" element or the equivalent thereof. Such claims should be understood to include incorporation of one or more such elements, neither requiring nor excluding two or more such elements. Other combinations and subcombinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

We claim:

1. A vehicle drive system, comprising:
a variable displacement engine including a plurality of cylinders, where at least one of the plurality of cylinders is deactivated to decrease engine displacement;
a torque converter operatively coupled to the variable displacement engine configured to operate with variable slip;
a driver interface for receiving a preference setting from a driver, the driver interface including a first setting indicating increased fuel economy where said torque converter is locked at a first engine speed, and a second setting indicating reduced noise or vibration where said torque converter is locked at a second engine speed, said first engine speed less than said second engine speed; and
a control system for receiving the preference setting from the driver, and adjusting torque converter slip based on the preference setting from the driver.

2. The vehicle drive system of claim 1 wherein the control system further increases an engine speed range and increases a throttle opening amount range over which cylinder deactivation is available, the increased engine speed range and increased throttle opening amount range based on the preference setting from the driver.

3. The vehicle drive system of claim 1 wherein said control system further adjusts a number of operating cylinders in response to the preference setting from the driver.

4. The vehicle drive system of claim 1 wherein the at least one of the plurality of cylinders includes deactivatable cylinder valves.

5. The vehicle drive system of claim 1 wherein the control system decreases said torque converter slip and increases an engine speed range where cylinder deactivation is operational for increased fuel economy.

6. A method for controlling vehicle operation, comprising:
receiving a driver preference from a driver by way of a driver interface, the driver interface including a first setting for reduced noise or vibration and decreased fuel economy, the first setting specifying cylinder deactivation in a first engine speed range and increased torque converter slip, and a second setting specifying increased noise or vibration and increased fuel economy, the second setting with an increased engine speed range for cylinder deactivation and with reduced torque converter slip; and
adjusting cylinder deactivation and torque converter slip based on the driver preference.

7. The method according to claim 6, where adjusting torque converter slip includes adjusting a torque converter lock-up clutch.

8. The method according to claim 7, where adjusting the torque converter slip based on the driver preference includes adjusting a torque converter locked and unlocked state.

9. A method for controlling vehicle operating parameters of a variable displacement engine having a torque converter and a driver interface, comprising:
sensing a vehicle operating condition;
selectively activating or deactivating one or more cylinders based on the vehicle operating condition and based on a drive preference setting selected by a driver through the driver interface; and
decreasing slip of the torque converter based on the drive preference setting selected by the driver when the drive preference setting indicates a preference for increased fuel economy, the drive preference setting selected by said driver through the driver interface.

10. The method according to claim 9, wherein the torque converter locks and unlocks at different operating conditions depending on said drive preference setting.

11. The method according to claim 9, where selectively activating or deactivating the one or more cylinders includes adjusting a cylinder to be activated and deactivated at different operating conditions depending on said drive preference setting.

12. The method according to claim 9 further comprising coordinating torque converter lock-up and cylinder activation or deactivation.

13. The method according to claim 9 wherein the drive preference settings indicate the driver's preference for a fuel economy versus NVH trade-off.

14. The method according to claim 9 wherein the driver interface comprises a dial.

15. The method according to claim 9 wherein the driver interface comprises a touch screen.

16. The method according to claim 9 wherein the driver interface comprises a voice recognition system.

* * * * *